United States Patent [19]

Hogge, Jr.

[11] Patent Number: 4,538,283

[45] Date of Patent: Aug. 27, 1985

[54] ADAPTIVE EQUALIZER SUITABLE FOR USE WITH FIBER OPTICS

[75] Inventor: Charles R. Hogge, Jr., Richardson, Tex.

[73] Assignee: Rockwell International Corporation, El Segundo, Calif.

[21] Appl. No.: 517,317

[22] Filed: Jul. 26, 1983

[51] Int. Cl.³ .............................................. H04B 1/12
[52] U.S. Cl. ....................................... 375/14; 375/11; 333/28 R
[58] Field of Search ................. 375/11, 14; 333/28 R, 333/18

[56] References Cited

U.S. PATENT DOCUMENTS

| | | | |
|---|---|---|---|
| 3,721,959 | 3/1973 | George | 375/100 |
| 3,792,356 | 2/1974 | Kobayashi et al. | 375/14 |
| 4,218,771 | 8/1980 | Hogge, Jr. | 375/120 |
| 4,361,892 | 11/1982 | Martin | 333/18 |
| 4,415,872 | 11/1983 | Karabinis | 375/14 |

*Primary Examiner*—Robert L. Griffin
*Assistant Examiner*—Timothy K. Greer

*Attorney, Agent, or Firm*—V. Lawrence Sewell; Howard R. Greenberg; H. Frederick Hamann

[57] ABSTRACT

A circuit for adaptively equalizing a digital signal to compensate for distortion introduced by a transmission medium. The circuit includes a first feedback path for modifying the input signal which is to be equalized to an extent controlled by a control input signal. A second feedback path modifies the input signal to an extent which tends to overcompensate the signal for the transmission distortion. Further, means are provided to modify the signal so as to undercompensate it for the transmission distortion. Error detectors detect pseudo bit errors in the overcompensated and the undercompensated signal, and a control input signal is generated for the first feedback path, dependent on the difference between the errors detected in the overcompensated and undercompensated signal. As a result, the modification of the signal in the first feedback path produces an equalization appropriate to the transmission distortion, and the circuit adaptively changes the equalization in accordance with changes in the transmission medium.

10 Claims, 2 Drawing Figures

ADAPTIVE EQUALIZER SUITABLE FOR USE WITH FIBER OPTICS

BACKGROUND OF THE INVENTION

This invention relates to an equalizer circuit of the kind used at the receiving end of a fiber optic system or other digital transmission system to reduce distortion introduced by the transmisson medium. In particular, the equalizer circuit of the present invention is capable of adapting to the equalization requirements of individual transmission mediums, such as individual optical fibers.

In digital transmission systems, filtering actions of the transmission medium cause distortion of the transmitted digital pulses such that pulses at the receiver may be spread over more than one baud interval. This intersymbol interference causes the "eye" opening exhibited by pulses at the receiver to close, beginning in the corners and progressing toward the center. The decision as to whether received data is a one or a zero can be made at the center of the baud interval, but as this portion of the eye begins to close, receiver sensitivity is reduced. It is the role of an equalizer to reduce intersymbol interference as much as possible so as to restore the receiver sensitivity.

In fiber optic systems, not all fibers produce exactly the same filtering of the transmitted pulses. Accordingly, it is desirable to provide an adaptive equalizer which automatically adjusts its equalization to an individual fiber.

SUMMARY OF THE INVENTION

The present invention provides a circuit for adaptively equalizing a digital signal from a transmission medium. The circuit includes a summing network for generating a first sum of the signal to be equalized and a feedback signal. This sum serves not only as the output of the equalizer circuit, but also as the input to a feedback path which generates the feedback signal. The feedback path includes a gain control for controlling the magnitude of the feedback signal in response to a control input signal. Another summing network generates a second sum of the signal to be equalized and the feedback signal weighted by an amount which tends to overcompensate for distortion in the transmission medium. Yet another summing network generates a third sum including the signal to be equalized, undercompensated for the distortion. "Pseudo-errors" in the second and third sums are detected, and an adaptive gain control input signal for the feedback path is generated dependent on the difference between the pseudo-errors detected in the second and the third sums.

In the face of changed conditions within the transmission medium, the amount of equalization previously provided by the circuit of the invention may not be appropriate. Is such a case, there will be a difference between the number of pseudo-errors detected in the overcompensated sum and the undercompensated sum. This difference creates a drive on the gain control in the feedback path to change the extent of equalization provided by the circuit. The amount of equalization provided by the circuit will stabilize at a new value that produces sustantially the same error rate in the overcompensated sum and the undercompensated sum. This stabilized value provides optimum equalization in the first sum, which is the output of the equalizer. The result is that adaptive equalization is acheived by a simple and economical circuit.

DESCRIPTION OF PREFERRED EMBODIMENT

Figure 1:
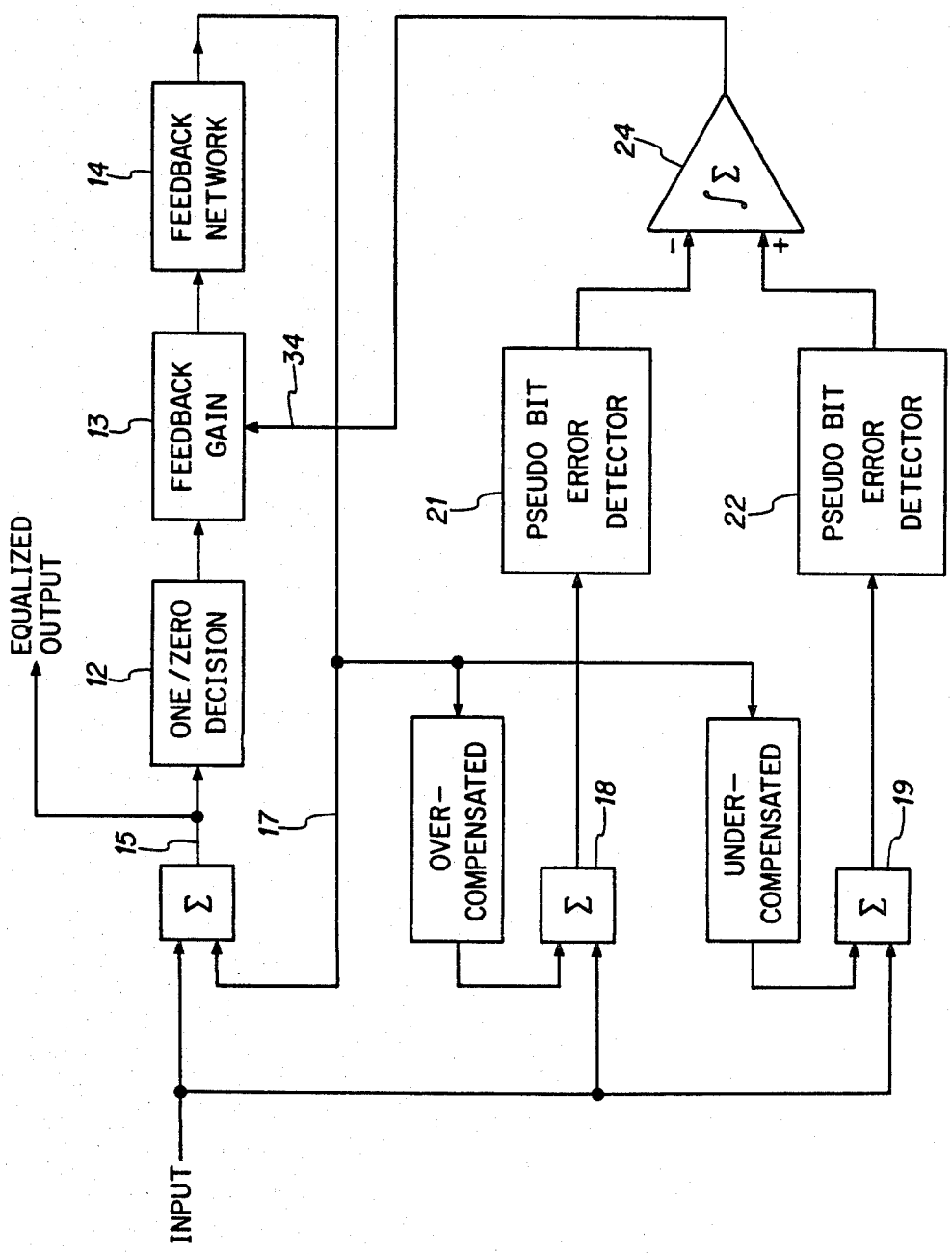
FIG. 1 is a block diagram of an adaptive equalizer circuit according to the invention.

The general structure and operational principles of the invention can be understood from a consideration of FIG. 1. The equalizing circuit which is to be adaptively controlled includes a one/zero decision device 12, a feedback gain control 13, feedback network 14, and a summing junction 15. The equalized output of the circuit is the sum, provided by junction 15 of the input signal and a feedback signal 17.

Feedback network 14 is selected to supply to summing junction 15 a voltage which when summed with the input signal produces an equalized signal in which the effects of interpulse interference have been substantially reduced. The feedback network 14 requires, in order to provide the proper equalizing voltage, a well-formed digital input which in a one/zero estimate of the output signal from junction 15. Decision device 12 receives the equalized output as its input, estimates whether this input represents a one or a zero and provides a digital output in accordance with the estimate. Feedback gain control 13 controls the magnitude of the digital signal on which feedback network 14 operates, and thereby controls the amount of equalization applied at summing junction 15. It is the control of this feedback gain which allows the overall circuit to adaptively set a level of equalization.

In the adaptive control portion of the equalizer circuit, there are two additional summing junctions 18 and 19. Junction 18 receives the input signal to be equalized and feedback signal 17, with the feedback signal weighted so that the output of summing junction 18 is overcompensated for distortion in the transmission medium. For example, if the input pulses to the equalizer require the addition of 0.2 volt at midpulse to counter the effects of intersymbol interference, the amount added to the input signal at summing junction 18 could be for example 0.3 volts. At summing junction 19, there is provided the sum of the feedback signal 17 and the input signal, with the feedback signal weighted so as to undercompensate for distortion. For example, 0.1 volts could be added to the input signal.

The output of summing junction 18 is processed by pseudo bit error detector 21. As will be described in detail below, detector 21 detects "pseudo-errors" due to the overcompensation, in accordance with a pseudo-error criterion, even when the input signal is being properly equalized at summing junction 15. Pseudo bit error detector 22 similarly detects pseudo-errors in the bit stream from summing junction 19, due to undercompensation.

The difference between the pseudo-errors found by detectors 21 and 22 is integrated by summing integrator 24, and the result is used to control the feedback gain 13.

The operation of the adaptive control portion of the circuit is as follows. In the steady state, the integrals of the outputs of pseudo-error detectors 21 and 22 are very nearly equal. Integrator 24 derives from the very small difference between the integrated errors a control signal for establishing feedback gain 13 at a level which produces these very nearly equal errors.

A change in the described steady state condition can be introduced by, say, a change in the transmission medium which causes the output of summing junction 15 no longer to be properly equalized. That is, the feedback gain 13 which was suitable for the prior condition of the transmission medium is no longer appropriate.

Presuming that such a change renders the feedback gain too high, then the output of summing junction 18 will be even more overcompensated than before, causing a higher pseudo-error rate detected by detector 21. On the other hand, the undercompensated nature of the sum at junction 19 can be expected to counteract somewhat the unduly large feedback gain 13, so that the bit error rate detected by detector 22 may decrease. As the difference between the integrated outputs of pseudo-error detectors 21 and 22 increases, the control input signal to feedback gain control 13 changes, moving the feedback gain toward a lower value gain. As this happens, the pseudo-errors from the overcompensated junction 18 decrease, and those from the undercompensated junction 19 increase. In the new steady state, as in the old one, the integrated outputs of pseudo-error detectors 21 and 22 are very nearly equal and the output of summing junction 15 is equalized by an amount appropriate to the changed condition of the transmission medium.

Figure 2:
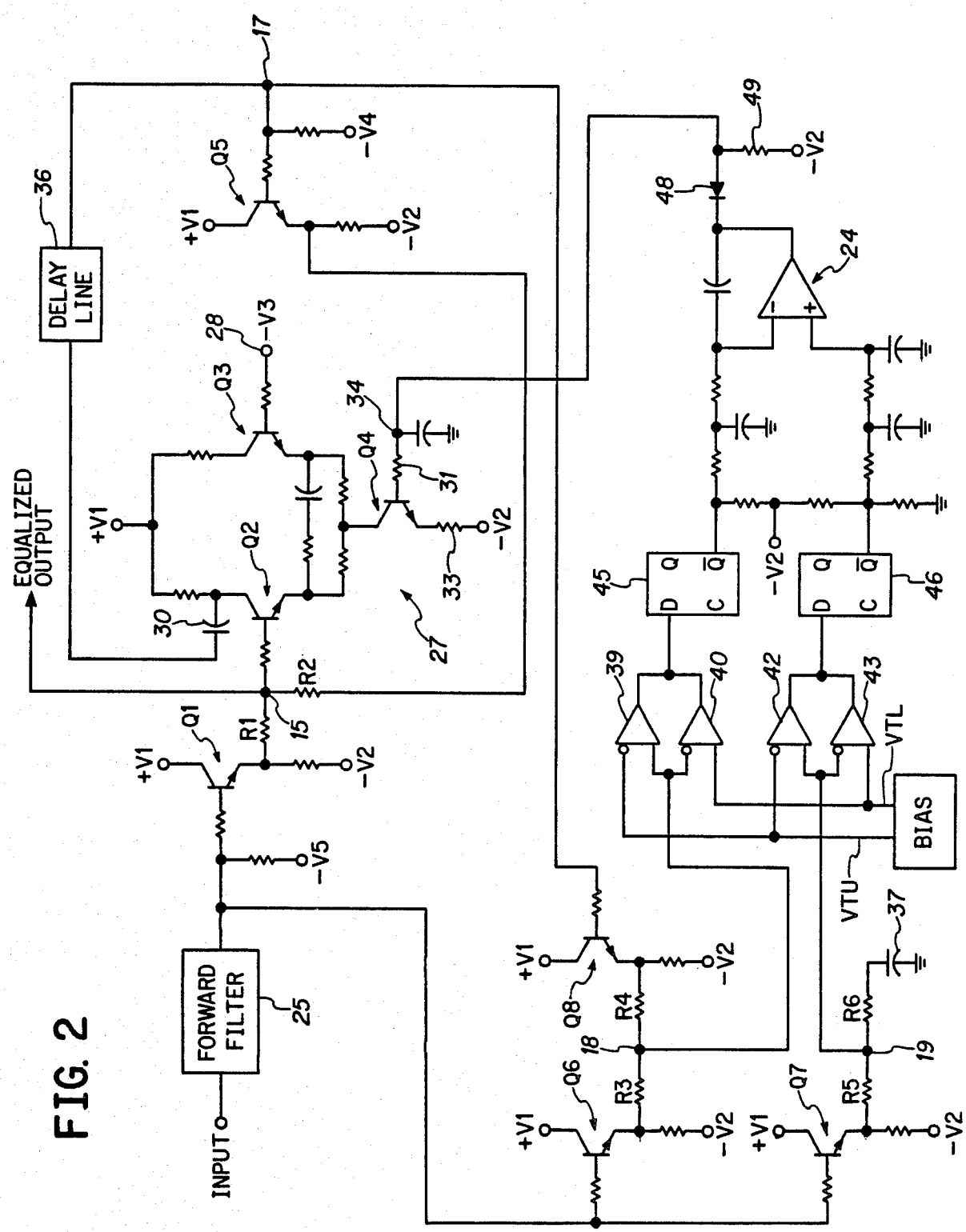
FIG. 2 is a schematic diagram of the circuit of FIG. 1.

FIG. 2 is a schematic diagram of the system of FIG. 1. The input signal is filtered by forward filter 25 and then coupled by the circuit of transistor Q1 to summing junction 15 through resistor R1. A feedback signal 17 is coupled by the transistor Q5 circuit to summing junction 15 through resistor R2.

The one/zero decision device 12 of FIG. 1 is implemented in FIG. 2 with a differential amplifier 27 comprised of transistors Q2 and Q3, with an associated gain control including transistor Q4. The voltage from summing junction 15 is connected to one input of the amplifier 27; at the other differential input 28 is a bias voltage V3 for setting a comparison threshold. When the voltage at summing point 15 exceeds the threshold, identifying it as a one bit, for example, transistor Q2 switches on, and transistor Q3 switches off. When the voltage at summing point 12 goes below the threshold, transistor Q2 switches off and transistor Q3 switches on. The output of the differential amplifier is coupled from the collector of transistor Q2 by means of capacitor 30. Thus, amplifier 27 generates a digital output which is an estimate of whether the sum at junction 15 represents a digital one or zero.

The circuit comprised of transistor Q4 and its resistors 31 and 33 serves as a controllable current sync for DC current flowing through transistors Q2 and Q3. As such, a level applied to control input 34 of the transistor Q4 circuit controls the magnitude of the digital output coupled by capacitor 30 from the differential amplifier 27. This function corresponds, of course, to feedback gain control 13 of FIG. 1.

The feedback network 14 of FIG. 1 is embodied in FIG. 2 by a delay line 36. Other suitable feedback networks, including multiple tap delay lines, can be employed, depending on the particular nature of the equalization to be achieved by the circuit.

In the adaptive control portion of the circuit of FIG. 2, the forward filtered input signal is coupled by the transistor Q6 circuit to summing junction 18 through resistor R3. Feedback signal 17 is coupled to junction 18 by the circuit of transistor Q8, through resistor R4. To achieve the overcompensation required at this junction, resistor R4 is chosen in relation to R3, so that the sum at junction 18 includes a proportionally greater amount of the feedback signal 17 than does the sum at junction 15.

In the undercompensated portion of the adaptive control, the forward filtered input signal is coupled by transistor Q7 to summing junction 19, through resistor R5. The feedback signal 17 can also be connected to summing junction 19, in the way that transistor Q8 couples the feedback signal to junction 18. However, in the detailed embodiment shown in FIG. 2, the sum at junction 19 is not only undercompensated, but uncompensated. It turns out that a suitable amount of compensation for summing junction 19 is essentially zero. Thus, it is effective to eliminate a connection to the feedback signal 17 and the associated coupling transistor network, simply connecting summing junction 19 to ground through resistor R6 and a capacitor 37.

In a preferred embodiment of the invention, a particular relationship is employed between the compensation employed at summing junctions 15, 18 and 19. In the preferred embodiment, the weight given the feedback signal 17 at junction 18 is twice the weight given the feedback signal at junction 15. In addition, as stated above, no weight is given to the feedback signal 17 at junction 19. Under these conditions, when the psuedo errors from the overcompensated and undercompensated signals are balanced, the optimum amount of equalization or compensation is applied at summing junction 15. However, other combinations of overcompensation and undercompensation can also provide optimal equalization of the circuit output.

The overcompensated signal from junction 18 is applied to amplifiers 39 and 40 which act as pseudo error comparators. The undercompensated signal is similarly connected to amplifiers 42 and 43. The term "pseudo-error" is used herein to emphasize that the errors referred to are artificially produced, and their occurrence does not mean that a receiver including the equalizer circuit is making errors.

The psuedo-errors in the circuit of the invention are artificially produced in two senses. First, the signals at summing junctions 18 and 19 are overcompensated and undercompensated respectively. Second, the pseudo bit error detectors 21 and 22 preferably have more stringent threshold requirements than would ordinarily be used in one/zero decision making. This is because, when there is a high level of received signal, even a deliberately overcompensated or undercompensated signal may give error free data detection by ordinary one/zero decision criteria. The circuit of the invention must be assured of a suitable pseudo-error rate, in order to generate control input signal 34 to the feedback gain control 13. In order to generate the necessary pseudo-errors, detectors 21 and 22 use offset thresholds which can be set to give very sensitive indications of signal imperfections, with the result that a slight reduction in eye opening will produce a large number of pseudo-errors.

The operation desired of the pseudo error comparators is to detect when the over- or undercompensated signal does not meet selected threshold criteria to be classified as either a one or a zero. By way of example, consider a situation in which a properly equalized signal representing a one bit can be expected to have a value of $-0.8$ volts and a zero bit will have a value of $-1.8$ volts. Then an upper threshold of $-1.1$ volts could be implemented in combination with undercompensation at junction 19, so that a significant number of one bits from that junction do not reach −0.8 volts, and are more negative than the −1.1 volt threshold. Such bits represent pseudo errors in the circuit of FIG. 2 and result in a zero output from amplifiers 42 and 43. The upper threshold in question, −1.1 volts, is implemented as bias VTU in the Figure.

Further, by way of example, with suitable overcompensation at junction 18, many zero bits from that junction would not become sufficiently negative to reach the −1.8 volt level, but would remain more positive than, say, a −1.5 volt threshold. This lower threshold is implemented by bias VTL in FIG. 2. This psuedo error would also result in a zero, this time at the output of amplifiers 39 and 40.

Clocked flip-flops 45 and 46 each output a one in the presence of a pseudo error detected by the associated comparators. The outputs of the flip-flops are low pass filtered, and the difference between them is integrated by integrator 24. A diode 48 and resistor 49 provide a level adjustment between the output of integrator 24 and control input 34 of differential amplifier 27.

While FIG. 2 illustrates the details of a circuit in accordance with the invention, the operation is that described in connection with FIG. 1. By the use of overcompensated and undercompensated signals generating pseudo bit errors under steady state operating conditions, the circuit of the present invention can adapt to a change in the transmission medium to automatically drive the circuit to a new equilibrium condition providing proper equalization.

Various modifications of the circuitry shown are possible, consistent with the scope of the present invention. One important variation would be to change a factor other than gain to influence feedback signal 17 in response to control input signal 34 (FIG. 1). By way of example, control input signal 34 could control the phase of the feedback signal. Then the phase of the input signal to summing junction 15 would be modified to an extent controlled by the adaptive control input signal 34. Other parameters or characteristics of feedback signal 17 can likewise be controlled, including frequency response characteristics.

I claim:

1. A circuit for adaptively equalizing a digital signal to compensate for distortion introduced by a transmission medium, comprising:
    means for modifying said digital signal, to an extent established by a controlling input signal, to provide an output signal for said circuit, said means being responsive, in feedback relationship, to said output signal;
    means, responsive to said output signal in feedback relationship, for modifying said digital signal by an amount selected to overcompensate said digital signal for said distortion, thereby providing an overcompensated control loop signal;
    means, for modifying said digital signal by an amount selected to undercompensate said digital signal for said distortion, thereby providing an undercompensated control loop signal;
    means for detecting errors in said overcompensated signal and errors in said undercompensated signal; and
    means for detecting the difference between said errors detected in said overcompensated signal and said undercompensated signal and generating said controlling input signal dependent on said difference,
    whereby said output signal is adaptively equalized.

2. The circuit of claim 1, wherein said means for detecting errors includes an error criterion selected to ensure a substantial rate of said errors under steady state adapted conditions.

3. A circuit for adaptively equalizing a digital signal to compensate for distortion introduced by a transmission medium, comprising:
    means for providing a first sum of the signal to be equalized and a feedback signal;
    means responsive to said first sum for generating said feedback signal, including means, responsive to a control input signal, for controlling the magnitude of said feedback signal;
    means for providing a second sum of said signal to be equalized and said feedback signal, including weighting said feedback signal in said sum by an amount which tends to overcompensate for said distortion;
    means for providing a compensation signal and for providing a third sum of the compensation signal and said signal to be equalized, so that said third sum tends to undercompensate for said distortion;
    means for detecting errors in said second and third sums; and
    means for detecting the difference between said errors detected in said second and said third sums and generating said control input signal dependent on said difference,
    whereby said first sum comprises an adaptively equalized output signal.

4. The circuit of claim 3, wherein said means for generating said feedback signal includes
    means for estimating a digital value represented by said first sum, and
    feedback network means for providing said feedback signal from said digital value.

5. The circuit of claim 3, wherein said means for generating said control input signal includes means for providing the integral of the difference between said errors detected in said second and said third sums.

6. The circuit of claim 3, wherein said means for detecting errors includes an error criterion selected to ensure a substantial rate of said errors under steady state adapted conditions.

7. The circuit of claim 6, wherein said means for detecting errors includes means for detecting signals which fail to satisfy selected threshold criteria for representing either a one or a zero bit.

8. The circuit of claim 3, wherein said third sum provides substantially no compensation for said distortion.

9. The circuit of claim 8, wherein said weighting is selected so that the feedback signal in said second sum is substantially twice the feedback signal employed in said first sum.

10. A circuit for adaptively equalizing a digital signal to compensate for distortion introduced by a transmission medium, comprising:
    summing network means for providing a first sum of the signal to be equalized and a feedback signal;
    a variable gain differential amplifier having first and second differential inputs and a gain control input, with said first differential input responsive to said first sum and said second differential input connected to a threshold bias, so that in response to a comparison of said sum and the threshold represented by said bias, said differential amplifier switches the output state thereof to provide a digital output, the magnitude of which is controlled by a level applied to said gain control input;

a feedback network, responsive to the magnitude controlled digital output, for providing said feedback signal;

a summing network means for providing a second sum of said signal to be equalized and said feedback signal weighted by an amount which tends to overcompensate for said distortion;

means for providing a compensation signal and for providing a third sum of the compensation signal and said signal to be equalized, said third sum tending to undercompensate for said distortion;

means for detecting errors in each of said second and third sums of signals, when each of the sums fails to satisfy selected threshold criteria identifying the sum as representing either a one or a zero bit, said threshold criteria being selected to ensure a substantial rate of said errors under steady state adapted conditions; and means for providing the difference between said errors detected in said second and third sums, providing the integral of said difference, and coupling said integral to said gain control input, whereby said first sum comprises an adaptively equalized output signal.

* * * * *